(12) United States Patent
Belling

(10) Patent No.: US 9,762,580 B2
(45) Date of Patent: Sep. 12, 2017

(54) POLICY CONTROL IN A NETWORK

(75) Inventor: Thomas Belling, Erding (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1247 days.

(21) Appl. No.: 12/111,162

(22) Filed: Apr. 28, 2008

(65) Prior Publication Data

US 2008/0271113 A1    Oct. 30, 2008

(30) Foreign Application Priority Data

Apr. 30, 2007  (EP) ................................... 07107227

(51) Int. Cl.
    *H04L 29/06*  (2006.01)
(52) U.S. Cl.
    CPC .............. *H04L 63/10* (2013.01); *H04L 63/20* (2013.01)
(58) Field of Classification Search
    CPC ................................ H04L 63/10; H04L 63/20
    USPC ............................................................ 726/1
    See application file for complete search history.

(56) References Cited

U.S. PATENT DOCUMENTS

| | | | | |
|---|---|---|---|---|
| 6,714,987 B1* | 3/2004 | Amin | ................ | H04L 29/06027 709/200 |
| 7,103,667 B1* | 9/2006 | Bell | .................... | H04L 12/1818 709/227 |
| 7,434,252 B2 | 10/2008 | Ballinger | .............. | G06F 21/335 713/172 |
| 7,559,080 B2* | 7/2009 | Bhargavan | .............. | H04L 63/08 713/151 |
| 7,783,771 B2* | 8/2010 | Pantalone | ........... | H04L 12/2809 370/351 |
| 7,797,406 B2* | 9/2010 | Patel | .................... | H04L 41/5022 709/220 |
| 2004/0184432 A1* | 9/2004 | Gateva | .................. | H04L 65/608 370/349 |
| 2005/0083912 A1* | 4/2005 | Afshar | .............. | H04L 29/06027 370/352 |
| 2005/0114674 A1* | 5/2005 | Carley | .................... | G06F 21/40 713/182 |
| 2005/0210141 A1* | 9/2005 | Oyama | .................. | H04L 12/14 709/228 |

(Continued)

FOREIGN PATENT DOCUMENTS

| CN | 1473443 A | 2/2004 |
|---|---|---|
| TW | 200642371 A | 12/2006 |

OTHER PUBLICATIONS

Microsoft Computer Dictionary, $5^{th}$ Edition, 2002, pp. 42-43.*

(Continued)

*Primary Examiner* — David Garcia Cervetti
(74) *Attorney, Agent, or Firm* — Squire Patton Boggs (US) LLP

(57) ABSTRACT

There are disclosed measures for policy control in a network, including an authorization check. Namely, a method of policy control in a network comprises obtaining, at an application function entity of the network, a request for a service, determining, at the application function entity, whether service information associated with the requested service requires an authorization check or a configuration of a policy enforcement entity of the network, and providing, depending on the determining result, an indication from the application function entity to a policy control entity of the network, whether or not the policy enforcement entity is to be configured for the requested service information, together with that requested service information.

32 Claims, 7 Drawing Sheets

(56) References Cited

U.S. PATENT DOCUMENTS

| | | | | |
|---|---|---|---|---|
| 2006/0045071 | A1* | 3/2006 | Vimpari | H04L 12/5695 370/352 |
| 2006/0059117 | A1* | 3/2006 | Tolson | G06F 21/6209 |
| 2006/0143466 | A1* | 6/2006 | Muller | H04L 63/0428 713/182 |
| 2006/0168303 | A1* | 7/2006 | Oyama | G06Q 30/0601 709/231 |
| 2006/0184998 | A1* | 8/2006 | Smith | H04L 12/4679 726/3 |
| 2007/0053361 | A1* | 3/2007 | Chen | H04L 12/5695 370/392 |
| 2007/0064709 | A1* | 3/2007 | Holmstrom | H04L 65/1006 370/395.2 |
| 2007/0064710 | A1* | 3/2007 | Holmstrom | H04W 28/26 370/395.2 |
| 2007/0101406 | A1* | 5/2007 | Zavalkovsky | H04L 63/0815 726/4 |
| 2007/0118878 | A1* | 5/2007 | Sastry | G06F 21/33 726/3 |
| 2007/0143488 | A1* | 6/2007 | Pantalone | H04L 63/08 709/230 |
| 2007/0143489 | A1* | 6/2007 | Pantalone | H04L 12/2809 709/230 |
| 2007/0156919 | A1* | 7/2007 | Potti | G06F 8/67 709/238 |
| 2007/0165630 | A1* | 7/2007 | Rasanen | H04L 12/5695 370/389 |
| 2007/0220588 | A1* | 9/2007 | Panda | G06Q 20/102 726/1 |
| 2007/0230453 | A1* | 10/2007 | Giaretta | H04L 63/08 370/389 |
| 2007/0283033 | A1* | 12/2007 | Bloebaum | H04M 1/6066 709/231 |
| 2008/0025230 | A1* | 1/2008 | Patel | H04L 41/5022 370/252 |
| 2008/0028453 | A1* | 1/2008 | Nguyen | G06F 21/335 726/9 |
| 2008/0049680 | A1* | 2/2008 | Mandayam | H04L 12/2859 370/331 |
| 2008/0059635 | A1* | 3/2008 | Seiferth | H04L 12/2876 709/226 |
| 2008/0115200 | A1* | 5/2008 | Olson | G06F 21/31 726/6 |
| 2008/0130627 | A1* | 6/2008 | Chen | H04L 45/02 370/351 |
| 2008/0148344 | A1* | 6/2008 | Rubio | G06F 21/31 726/1 |
| 2008/0148345 | A1* | 6/2008 | Rubio | G06F 21/31 726/1 |
| 2008/0162720 | A1* | 7/2008 | Gulati | H04L 63/20 709/238 |
| 2008/0244712 | A1* | 10/2008 | Kitada | G06F 21/41 726/5 |
| 2008/0271113 | A1* | 10/2008 | Belling | H04L 63/20 726/1 |
| 2009/0215454 | A1* | 8/2009 | Przybysz | H04M 15/00 455/435.1 |
| 2009/0228956 | A1* | 9/2009 | He | H04L 63/20 726/1 |
| 2009/0252049 | A1* | 10/2009 | Ludwig | H04W 28/24 370/252 |
| 2010/0061316 | A1* | 3/2010 | Levenshteyn | H04L 65/80 370/329 |
| 2010/0165902 | A1* | 7/2010 | Kvernvik | H04L 12/189 370/312 |

OTHER PUBLICATIONS

3GPP TS 23.203 V7.2.0, "3rd Generation Partnership Project; Technical Specification Group Services and System Aspects; Policy and Charging Control Architecture", Global System for Mobile Communications, Mar. 2007, pp. 1-71.
3GPP TS 29.212 V7.0.0, "3rd Generation Partnership Project; Technical Specification Group Core Network and Terminals; Policy and Charging Control over Gx Reference Point (Release 7)", Global System for Mobile Communications, Mar. 2007, pp. 1-32.
3GPP TS 29.213 v7.0.0, 3rd "3rd Generation Partnership Project; Technical Specification Group Core Network and Terminals; Policy and Charging Control ;(Release 7)", Global System for Mobile Communications, Mar. 2007, pp. 1-49.
3GPP TS 29.214 V7.0.0, 3rd "3rd Generation Partnership Project; Technical Specification Group Core Network and Terminals; Policy and Charging Control Over Rx Reference Point (Release 7)", Global System for Mobile Communications, Mar. 2007, pp. 1-28.
M. Handley et al., "SDP: Session Description Protocol", Network Working Group, Request for Comments: 4566, Jul. 2006, pp. 1-46.
J. Rosenberg et al., "An Offer/Answer Model with the Session Description Protocol (SDP)", Network Working Group, Request for Comments: 3264, Jun. 2002, pp. 1-24.
J. Rosenberg et al., "SIP: Session Initiation Protocol", Network Working Group, Request for Comments: 3261, Jun. 2002, pp. 1-144.
3GPP TS 23.207 V6.6.0, "3rd Generation Partnership Project; Technical Specification Group Services and System Aspects; End-to-End Quality of Service (QoS) Concept and Architecture (Release 6)", Sep. 2005, pp. 1-52.
3GPP TS 29.207 V6.5.0, "3rd Generation Partnership Project; Technical Specification Group Core Network and Terminals; Policy Control Over Go Interface (Release 6)", Global System for Mobile Communications, Sep. 2005, pp. 1-58.
3GPP TS 29.208 V6.6.1, "3rd Generation Partnership Project; Technical Specification Group Core Network and Terminals; End-toEnd Quality of Service (QoS) Signalling Flows (Release 6)", Global System for Mobile Communications, Mar. 2006, pp. 1-47.
3GPP TS 29.209 V6.6.0, "3rd Generation Partnership Project; Technical Specification Group Core Network and Terminals; Policy Control Over Gq Interface (Release 6)", Sep. 2006, pp. 1-24.
3GPP TS 23.125 V6.8.0, "3rd Generation Partnership Project; Technical Specification Group Services and System Aspects; Overall High Level Functionality and Architecture Impacts of Flow Based Charging; Stage 2 (Release 6)", Mar. 2006, pp. 1-483GPP TS 29.210 V6.7.0.
3GPP TS 29.210 V6.7.0, "3rd Generation Partnership Project; Technical Specification Group Core Network and Terminals; Charging Rule Provisioning Over Gx Interface (Release 6)", Global System for Mobile Communications, Dec. 2006, pp. 1-21.
3GPP TS 29.211 V6.3.0, "3rd Generation Partnership Project; Technical Specification Group Core Network and Terminals; Rx zomyrtface amd Rx/Gx Signalling Flows (Release 6)", Global System for Mobile Communications, Dec. 2005, pp. 1-26.
3GPP TS 23.228 V8.0.0, "3rd Generation Partnership Project; Technical Specification Group Services and System Aspects; IP Multimedia Subsystem (IMS); Staqge 2 (Release 8)", Mar. 2007, pp. 1-218.
3GPP TS 24.229 V7.7.0, 3rd Generation Partnership Project; Technical Specification Group Core Network and Terminals; IP Multimedia Call Control Protocol Based on Session Initiation Protocol (SIP) and Session Description Protocol (SDP); Stage 3 (Release 7), Global System for Mobile Communications, Mar. 2007, pp. 1-409.
3GPP TSG-CT WG3 Meeting #43bis, C3-070338, Change Request 29.214 CR 012, Apr. 11-12, 2007, pp. 1-7.
3GPP TSG-CT WG3 Meeting #43, C3-070103, "Rejection of Rx Service Request", Feb. 5-9, 2007, pp. 1-7.
EP Communication, 07107227.6, Dec. 12, 2007, Extended European Search Report, Dec. 6, 2007, a total of 7 pages.
Quentin Zervaas; Practical Web 2.0 Applications with PHP, Relevant Pages: Cover Page, p. 1, and p. 45; Chapter 3, "User Authentication, Authorization, and Management".
Search Report dated May 9, 2014, issued in corresponding TW patent application No. 97115540 (with English translation).

* cited by examiner

POLICY CONTROL IN A NETWORK

FIELD OF INVENTION

The present invention relates to policy control in a network. In particular, the present invention relates to an authorization of required services in a policy control framework in a network such as e.g. a multimedia subsystem network.

BACKGROUND OF THE INVENTION

In general, policy control is a known process in networks such as communication networks, whereby a policy control entity indicates to a policy enforcement entity e.g. how to control bearer resources. In an IP-based (IP: Internet Protocol) network environment, such as an IP Connectivity Access Network (IP-CAN), the IP-CAN bearer may be controlled by way of policy control. Policy control may include QoS (quality of service) control, gating control and the like.

In current specifications of the $3^{rd}$ Generation Partnership Project (3GPP), several policy control mechanisms are standardized or under standardization. Although the present invention described below is not restricted to any specific policy control mechanism, the following mechanisms may be mentioned as examples.

In specifications 3GPP TS 23.203, TS 29.212, TS 29.213 and TS 29.214, there is defined "Policy and Charging Control" (PCC). The PCC mechanism basically combines functionalities of its predecessors which are "Service Based Local Policy" (SBLP) and "Flow based Charging" (FBC).

All of the above-mentioned mechanisms assume that a so-called application function (AF), i.e. an element offering application(s) that use IP bearer resources, provides information about a service to some policy control node. The policy control node then uses this information to instruct a policy enforcement node e.g. being located within some kind of gateway to configure and/or authorize bearer resources according to the needs of the requested service, to configure service-specific charging of media flows associated with a requested service and/or to install IP flow filters that prevent the usage of bearer resources for unwanted services. In this regard, an IP flow means a unidirectional flow of IP packets with the same source IP address and port number and the same destination IP address and port number, and the same transport protocol port numbers are only applicable if used by a transport protocol. Currently, the provisioning of each service information (which may include information about an AF session, e.g. application identifier, type of media, bandwidth, IP address and port number) from the application function triggers the policy control node to instruct the policy enforcement node to configure and/or authorize bearer resources, to configure service-specific charging of the media flows, and/or to install IP flow filters. The policy control node shall provision e.g. PCC rules to the policy enforcement node.

As one example, the information about requested services, which the application function derives and sends to the policy control node, may be provided by way of a "Session Description Protocol" (SDP, as e.g. defined in IETF RFC 4566 and RFC 3264), as transported within a call control according to a "Session Initiation Protocol" (SIP, as e.g. defined in IETF RFC 3261). As the use of SDP/SIP signalling is widely spread in modern networks, such as for example in an IP Multimedia Subsystem (IMS), such a signalling is utilized in the following as a non-limiting example for session signalling.

According to SDP/SIP-based session signalling, as e.g. defined in IETF RFC 3264, signalling payload may be distinguished as being of offer type or of answer type. In the offer/answer model, one participant offers the other a description of the desired session from its perspective, and the other participant answers with the desired session from its perspective. Thus, a negotiation of service properties is effected. This offer/answer model is most useful in unicast sessions where information from both participants is needed for the complete view of the session, as e.g. in policy control.

In currently specified policy control procedures, as e.g. defined in specifications 3GPP TS 29.213 and TS 29.214, an application function provides service information only after receiving an SDP answer, but not already after receiving a preceding SDP offer. This is however disadvantageous for modern networks as such procedures need more time in order to handle (e.g. reject) a requested service.

In order to overcome the disadvantage of currently specified policy control procedures, there are recently discussed related procedures. For the IMS for example, a proxy call session control function (P-CSCF) acting as an application function needs to provide requested service information to the policy control node already when receiving an SDP offer (see e.g. IETF RFC 3264) within SIP in order to be able to reject the SIP session with appropriate SIP messages, if the policy control node rejects the requested service information.

In contrast to these recently discussed procedures differing from currently specified procedures, the current procedures have the advantage that the service information derived from the SDP answer is better suited to configure and/or authorize bearer resources, to configure service-specific charging of media flows, and/or to install IP flow filters. This is due to the following drawbacks of the recently discussed procedures.

Firstly, the SDP offer is usually contained in a SIP INVITE request that is forwarded by the P-CSCF at the beginning of the call setup before the call reaches the callee, who may be not reachable. Thus, a considerable fraction of call attempts will fail after this point in time. This fraction may be reduced when the SDP answer is received, as the SDP answer is sent by the callee's terminal, thus guaranteeing that the callee is reachable.

Secondly, the SDP answer reflects the media for a service to be used more correctly than the SDP offer, since entire media components (e.g. video in addition to speech) or codecs for a media component, which have been contained in the offer, may be rejected/modified in the answer, or the directionality of media components may be changed. Thus, if bearer resources are set up according to the service information derived from the SDP offer, they may exceed the real needs for the finally negotiated service.

Thirdly, as both the SDP offer and the SDP answer each only contain destination IP address and port information for IP flows in the direction towards the sender of this SDP, information from the SDP offer and answer needs to be combined to configure all required IP flow filters.

Fourthly, the SDP offer is quickly followed by an SDP answer in normal message exchange. If control information both from the offer and the answer is provisioned towards the policy enforcement node, the related signalling load is doubled between policy control node and the policy enforcement node as compared to current procedures, where only the SDP answer triggers such a provisioning. In addition this may also lead to additional bearer level, e.g. GPRS (General Packet Radio Service), signalling to configure bearer resources accordingly.

In view of the above, it is evident that there exist several problems in the field of policy control in networks regarding both currently specified and recently discussed procedures.

Thus, a solution to the above problems and drawbacks is needed for providing an effective policy control in networks such as for an IP Multimedia Subsystem as a non-limiting example of a network.

SUMMARY OF THE INVENTION

Consequently, it is an object of the present invention to remove or at least mitigate above-mentioned problems and/or drawbacks inherent to known approaches of policy control mechanisms.

In one aspect of the invention, a method of policy control in a network comprises obtaining a request for a service at an application function entity of the network; determining, at the application function entity, whether service information associated with the requested service requires an authorization check or a configuration of a policy enforcement entity of the network; and providing an indication from the application function entity to a policy control entity of the network, indicating whether or not the policy enforcement entity is to be configured for the requested service information, together with the requested service information, in accordance with the determining. In one embodiment, the obtaining comprises the application function entity receiving the request for a service in a session description payload. The determining may comprise the application function entity determining whether the session description payload is of offer type or of answer type. In one embodiment, if the session description payload is of answer type, the method further comprises providing an indication that the policy enforcement entity is to be configured for the requested service information. In one embodiment, the method further comprises initiating a configuration of the policy enforcement entity for the requested service information at the policy control entity.

In one embodiment, the method further comprises, if the session description payload is of offer type, providing an indication that the policy enforcement entity is not to be configured and an authorization of the requested service information is to be checked at the policy control entity. The method may further comprise checking an authorization of the requested service information based on a local policy at the policy control entity. In one embodiment, the method further comprises responding by giving a cause for non-authorization from the policy control entity to the application function entity if the requested service information is not authorized. In another embodiment, the method further comprises responding by designating service information suitable for being authorized, from the policy control entity to the application function entity, if the requested service information is not authorized. In one embodiment, the method further comprises responding by designating service information suitable for being authorized, from the policy control entity to the application function entity, if the requested service information is not authorized. In one embodiment, the method further comprises responding by indicating a successful authorization from the policy control entity to the application function entity if the requested service information is authorized.

In one embodiment, the method further comprises deciding, at the application function entity in accordance with a response from the policy control entity, whether to reject the requested service, to forward requested service information from the application function entity towards a destination entity, or to reply to the received service request with service information. In one embodiment, the method further comprises modifying requested service information at the application function entity, wherein the providing is based on the modified requested service information.

In one embodiment, an interface between the application function entity and the policy control entity is based on a Diameter protocol. The providing the indication from the application function entity to the policy control entity may be effected by an attribute value pair of a Diameter request message.

In one embodiment, giving a cause is effected by an attribute value pair of a Diameter answer message. The attribute value pair may be at least one of a enumerated type and a octectstring type.

In one embodiment, the network comprises an Internet Protocol Multimedia Subsystem. In one embodiment, policy control in the network is based on at least one of a policy and charging control framework, a service based local policy framework, and a flow based charging framework.

In another aspect, the invention relates to an apparatus comprising obtaining means configured to obtain a request for a service; determining means configured to determine whether the service information associated with the requested service requires an authorization check or a configuration of a policy enforcement entity of the network; and providing means configured to provide an indication to a policy control entity of the network, indicating whether or not the policy enforcement entity is to be configured for the requested service information, together with the requested service information, in accordance with the determining.

In another aspect, the invention relates to an apparatus comprising a receiver configured to receive an indication from an application function entity of the network, indicating whether or not service information associated with a requested service requires an authorization check or a configuration of a policy enforcement entity of the network. In one embodiment, the apparatus further comprises means configured to initiate a configuration of the policy enforcement entity for the requested service information, if an indication is received from the application function entity that the policy enforcement entity is to be configured for the requested service information.

In one embodiment, the apparatus further comprises a checking means configured to check an authorization of the requested service information based on a local policy, if an indication is received from the application function entity that the policy enforcement entity is not to be configured and an authorization of the requested service information is to be checked at the apparatus. In one embodiment, the apparatus further comprises responding means configured to provide a cause for non-authorization to the application function entity, if the checking means yields that the requested service information is not authorized. In another embodiment, the apparatus further comprises a responding means configured to designate service information suitable for being authorized to the application function entity, if the checking means yields that the requested service information is not authorized. In one embodiment, the apparatus is configured to communicate with the application function entity based on a Diameter protocol.

In another aspect of the invention, a computer program product embodied on a computer-readable medium comprises a program code for obtaining a request for a service at an application function entity of the network; a program code for determining, at the application function entity, whether service information associated with the requested service requires an authorization check or a configuration of a policy enforcement entity of the network; and a program code for providing an indication from the application function entity to a policy control entity of the network, indicating whether or not the policy enforcement entity is to be configured for the requested service information, together with the requested service information, in accordance with the determining.

In another aspect, the invention relates to an apparatus comprising a processor and a memory unit communicatively connected to the processor. The memory unit includes computer code for obtaining a request for a service at an application function entity of the network; computer code for determining, at the application function entity, whether service information associated with the requested service requires an authorization check or a configuration of a policy enforcement entity of the network; and computer code for providing an indication from the application function entity to a policy control entity of the network, indicating whether or not the policy enforcement entity is to be configured for the requested service information, together with the requested service information, in accordance with the determining.

BRIEF DESCRIPTION OF THE DRAWINGS

In the following, the present invention will be described in greater detail by way of non-limiting examples with reference to the accompanying drawings, in which.

DETAILED DESCRIPTION OF THE VARIOUS EMBODIMENTS

Figure 1:
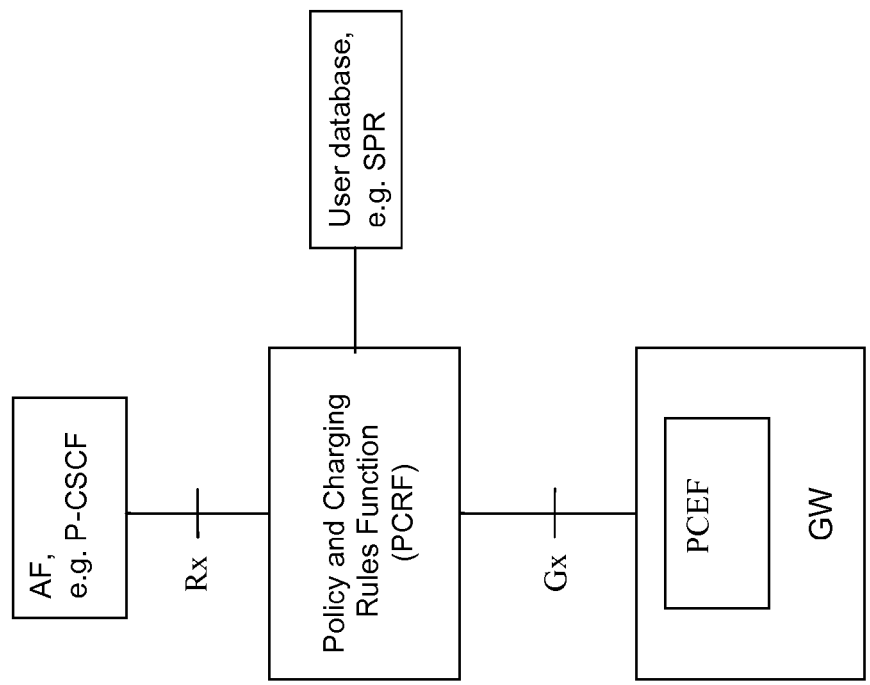
FIG. 1 shows a schematic block diagram of a basic network configuration in which embodiments of the present invention may be applied.

The present invention is described herein with reference to particular non-limiting examples. A person skilled in the art will appreciate that the invention is not limited to these examples, and may be more broadly applied.

In particular, the present invention and its embodiments is mainly described in relation to an IP Multimedia Subsystem (IMS) used as a non-limiting example for a network configuration. As such, the description of the embodiments given herein specifically refers to terminology which is directly related to IMS. In this regard, SDP and SIP terminology is used for session signaling purposes, while any other session signaling mechanism may also be utilized as long as compliant with the described features. Such terminology is only used in the context of the presented non-limiting examples, and does naturally not limit the invention in any way.

In particular, other types of application functions than those exemplarily described below may also be applied, and may thus also benefit from the present invention and embodiments thereof. For instance, servers that provide contents for download or streaming, such as video on demand or news services may be mentioned as some non-limiting examples. As such, different application functions may use different signalling protocols other than SDP/SIP to negotiate a setup or modification of a service, for instance the RealTime Streaming Protocol (RTSP) or some Hypertext Transfer Protocol (HTTP) based protocol. For instance, such application functions may use embodiments of the present invention prior to offering or agreeing to deliver a service to inquire, if a policy/charging control node will authorize the media required for the service, while e.g. requesting that the policy enforcement node is not configured at this stage. Such application functions may then use embodiments of the present invention when service delivery is started to request from the policy/charging control node that a policy enforcement node is configured to support that service. The application function, if it is a content server such as a download server, streaming server or the like, may have some internal knowledge about the service(s) it provides, so saying that it obtains a request for a service, and bases the further processing as described below on the thus requested service.

Similarly, in the following, a policy control mechanism on the basis of PCC will be mainly described, while policy control according to SBLP and/or FBC is equally applicable.

The subsequently described principles and embodiments of the present invention are based on one or more of the following notions.

The policy control entity may reject a service request from the application function entity, if the requested service is not acceptable according to operator policy or subscription information.

The policy control entity may indicate, in a response to the application function entity, the service information that can be accepted by the policy control entity.

For IMS specifically, the policy control entity needs to inspect the SDP offer in most cases to reject the request early enough to apply proper SIP procedures. On the other hand, the service information derived from an SDP answer is better suited to configure and/or authorize bearer resources according to the needs of this service, and may be therefore used for this task.

FIG. 1 shows a schematic block diagram of a basic network configuration in which embodiments of the present invention may be applied.

Basically, an application function AF entity is connected with a policy control entity, and the policy control entity is connected with a gateway incorporating a policy enforcement entity and with a user database.

Assuming that IMS is the underlying network and PCC is used as an example of a policy control mechanism, as exemplarily depicted in FIG. 1, a proxy call session control function P-CSCF acts as the application function entity, a policy and charging rules function PCRF acts as the policy control entity, a policy and charging enforcement function PCEF acts as the policy enforcement entity, which is typically located in a gateway node GW, and a subscription profile repository SPR acts as the user database. The interface between AF/P-CSCF and PCRF is referred to as Rx reference point, and the interface between PCRF and GW/PCEF is referred to as Gx reference point.

In case SBLP was used instead of PCC as an alternative policy control mechanism, a policy decision function PDF would act as the policy control entity, and a policy enforcement function PEF would acts as the policy enforcement entity. The interface between AF/P-CSCF and PDF would then be referred to as Gq reference point.

Further, in case FBC was used instead of PCC as another alternative policy control mechanism, a charging rules function CRF would act as the policy control entity, and a traffic plane function TPF would act as the policy enforcement entity. The interface between AF/P-CSCF and CRF would then be referred to as Rx reference point.

Principles and embodiments of the present invention as described herein may be easily transferred between different policy control mechanisms, as e.g. the SBLP Gq interface, the FBC Rx interface and the PCC Rx interface protocols are very similar to each other. To introduce the ability the reject service information within the SBLP Gq protocol and the FBC Rx protocol, only a fairly simple failure cause is to be added. Both for FBC and SBLP, similar advantages as described herein for PCC can then be achieved.

As already mentioned, the following is applicable to any one of the above-described configurations, even if the description relates to one example thereof. That is, in the following, the acronym P-CSCF is used as a non-limiting example for an application function entity, the acronym PCRF is used as a non-limiting example for a policy control entity, and the acronym PCEF is used as a non-limiting example for a policy enforcement entity.

Figure 2:
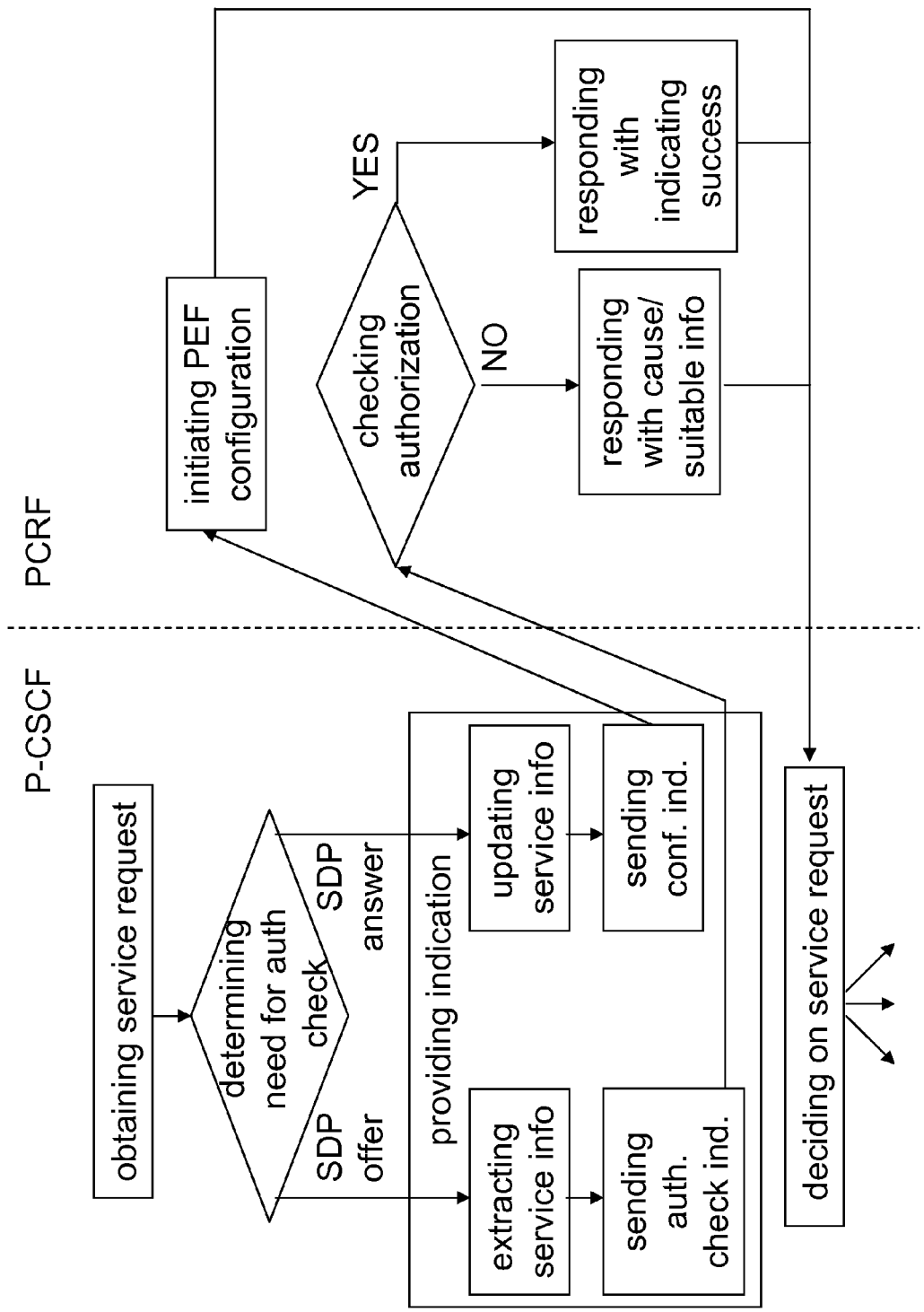
FIG. 2 shows a flow chart illustrating a method according to an embodiment of the present invention.

FIG. 2 shows a flow chart illustrating a method according to an embodiment of the present invention. In FIG. 2, the overall method is depicted in that the left-hand side illustrates the method steps performed at the application function entity, i.e. at the P-CSCF, and the right-hand side illustrates the method steps performed at the policy control entity, i.e. at the PCRF, the sides being separated by a vertical broken line. Although FIG. 2 depicts the overall method incorporating both sides, the present invention and embodiments thereof also cover the distinct methods performed at each side separately.

Initially, the application function entity obtains a request for a certain service, which may originate from the interior or exterior thereof. In the exemplary case shown in FIG. 2, the P-CSCF for example receives SDP payload, which represents any kind of session description payload including requested service information. Next, the application function entity determines whether service information associated with the requested service requires (only) an authorization check or (also) a configuration of a policy enforcement entity of the network. In the exemplary case shown in FIG. 2, the P-CSCF for example determines whether the received SDP payload is of offer type (i.e. SDP offer) or of answer type (i.e. SDP answer). Depending on the determining result, the P-CSCF provides an indication to the PCRF whether or not the PCEF is to be configured for the requested service information.

On the one hand, if the SDP payload is determined to be an SDP answer, an indication is provided to the PCRF that the PCEF is to be configured for the requested service information. In case the SDP answer includes modified service information as compared to the original service information previously received at the P-CSCF, the indication is based on the modified, i.e. updated, service information, wherein the optional step of information updating is performed before sending the indication to the PCRF. In this case, when PCEF configuration is to be performed, upon receipt of the respective indication the PCRF initiates a respective PEF configuration with the sent service information. After PCEF configuration, the PCRF responds to the P-CSCF. Upon receipt of a response from the PCRF, the P-CSCF decides how to proceed. In the present case, it is e.g. decided to reply to the service request, i.e. to the received session description payload, with service information, e.g. a session description payload of answer type (i.e. SDP answer).

On the other hand, if the SDP payload is determined to be an SDP offer, an indication is provided to the PCRF that the PCEF is not to be configured, but an authorization of the requested service information is to be checked at the PCRF. Thus, in this case, no interaction between PCRF and PCEF will be executed in contrast to the above case. In detail, the P-CSCF extracts/derives the information of the requested service from the received SDP offer. Then, the indication of a required authentication check is sent to the PCRF. In this case, when the PCEF configuration is not to be performed, upon receipt of the respective indication the PCRF checks an authorization of the requested service information, which may based on a local policy. If the requested service information is not authorized (i.e. NO in FIG. 2), the PCRF responds to the P-CSCF by giving a cause for non-authorization. In addition thereto, if the requested service information is not authorized (i.e. NO in FIG. 2), the PCRF may respond to the P-CSCF by designating service information which would be suitable for being authorized based on the local policy. If the requested service information is authorized (i.e. YES in FIG. 2), the PCRF responds to the P-CSCF by indicating a successful authorization.

Upon receipt of a response from the PCRF, the P-CSCF decides, depending on the response (i.e. whether authorization was successful or not, as well as based on the kind of requested service information (e.g. derived from SDP offer or answer), how to proceed. Namely, it is decided whether to reject the requested service, which is the case e.g. when authorization was denied at the PCRF, or to forward requested service information, e.g. a session description payload of offer type (i.e. SDP offer) including requested service information, towards a destination entity, which is the case e.g. when the received SDP payload was of offer type and the authorization was successful at the PCRF.

Although not explicitly depicted in FIG. 2, the P-CSCF may optionally comprise a further function of modifying requested service information received, wherein the indication provisioning is also based on the modified requested service information.

In principle, the message/information exchange between the P-CSCF and the PCRF may be implemented in various ways according to physical properties of and/or protocols used on the interface there-between. For example, as detailed below, if a Diameter protocol is used on the Rx reference point, Diameter AA-Request and Diameter AA-Answer messages may be used. For details in this regard, reference is made to FIGS. 4 to 7 below.

Figure 3:
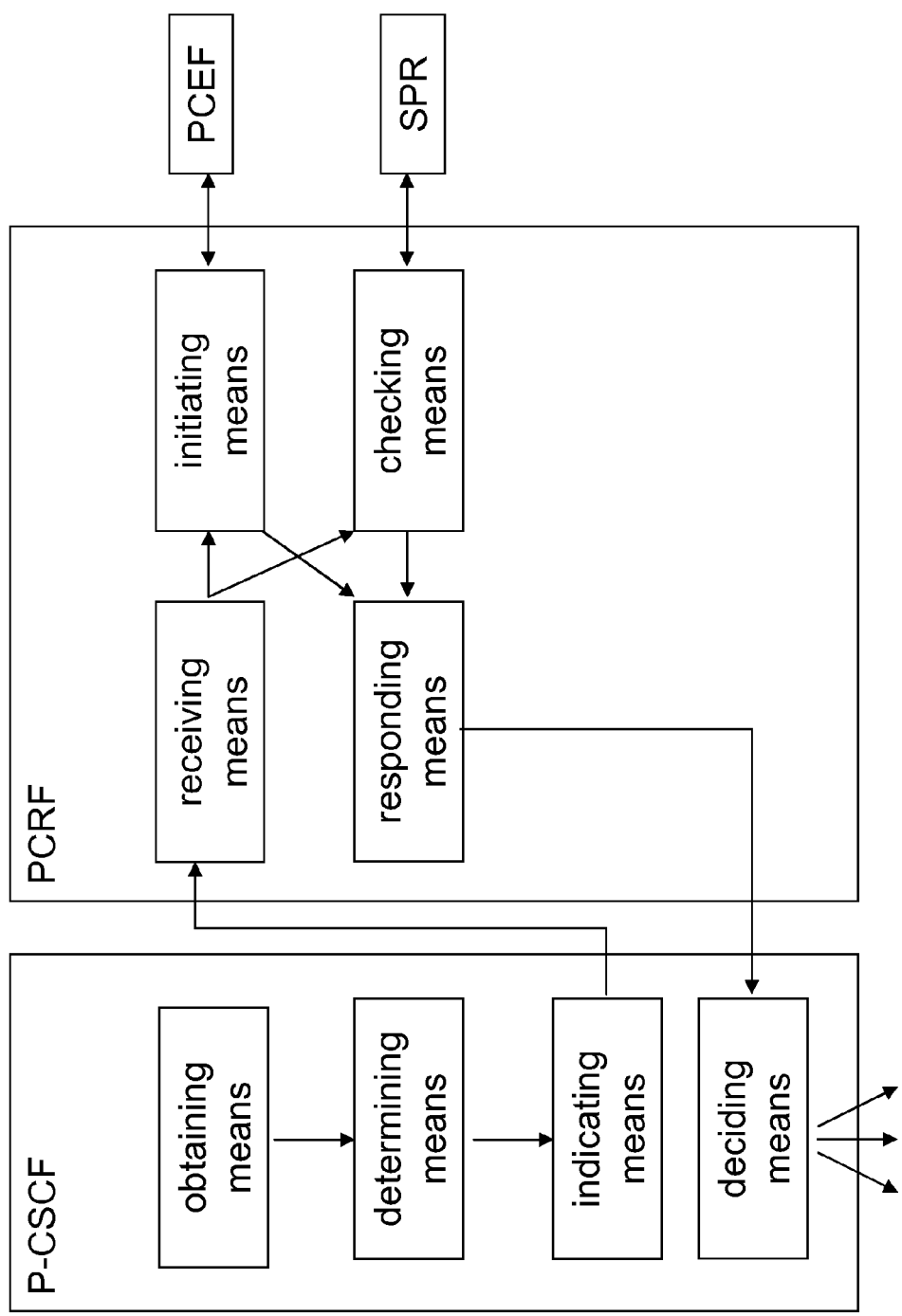
FIG. 3 shows a schematic block diagram of apparatuses according to embodiments of the present invention, and FIGS. 4 to 7 each show a flow diagram illustrating a signaling flow of methods according to embodiments of the present invention.

FIG. 3 shows a schematic block diagram of apparatuses according to embodiments of the present invention. The illustration of FIG. 3 is basically arranged in correspondence with the illustration of FIG. 2. The present invention and embodiments thereof cover both apparatuses denoted by P-CSCF and PCRF separately or in combination as a system.

Basically, the P-CSCF is arranged to carry out the method steps shown on the left-hand side of FIG. 2, and the PCRF is arranged to carry out the method steps shown on the right-hand side of FIG. 2. To this end, the apparatuses each comprise respectively adapted functionality, which is implementation-independent and depicted in FIG. 3 as separate functional blocks. Nevertheless, the individual functions may for example also be implemented by a common processor. The arrows between the individual functional blocks indicate the connection there-between as well as the processing flow, as may also be seen from FIG. 2.

As the correlation between the functions or method steps according to FIG. 2 and the functional blocks according to FIG. 3 is self-explanatory, a detailed description thereof is omitted here for the sake of completeness. Reference is made to the description in connection with FIG. 2.

Similarly, although no modification means is shown in FIG. 3, the P-CSCF apparatus may comprise such a functional block with the respective functionality as indicated in connection with FIG. 2.

According to the above-described embodiments, a P-CSCF acting as application function entity uses an indication to indicate to the PCRF acting as policy control entity that no configuration of the PCEF acting as policy enforcement entity is requested, when providing service information derived from an SDP offer.

Further, according to the above-described embodiments, a P-CSCF acting as application function uses an indication to indicate to the PCRF acting as policy control entity that a configuration of the PCEF acting as policy enforcement entity is requested, when providing service information derived from an SDP answer.

Thus, there is enabled a rejection of service information by the PCRF at a point in time that is suitable for the P-CSCF to reject the corresponding SIP session setup attempt with an appropriate SIP failure message, e.g. a 488 failure response. Also, an unnecessary configuration at the PCEF at this point of time is avoided, thus reducing the signalling load between PCRF and PCEF and also avoiding a possible unnecessary or excessive reservation of bearer resources.

Before some exemplary embodiments of the present invention will be described with reference to FIGS. 4 to 7, details about the message exchange on the Rx interface are given, which are applicable to, but not compulsory for, any one of the below embodiments.

In this regard, it is assumed that the Diameter protocol is applied on the Rx interface between application function entity, e.g. P-CSCF, and policy control entity, e.g. PCRF. In this case, Diameter messages are used for message exchange, wherein Diameter messages are defined to include so-called Attribute-Value Pairs (AVPs) corresponding to information elements in a Diameter message.

The above-described indication whether a configuration of the PCEF is requested may then be encoded within a new Diameter AVP, which may e.g. be of enumerated type. This new AVP may for example be named as "Authorization-Check-Request" AVP, which could for example have AVP code 525.

For example, two enumerated values could be defined, one to request a configuration of the PCEF according to the requested service information (by the provisioning of PCC rules and/or authorized QoS), and one to request a check of an authorization of the requested service information without a corresponding configuration of the PCEF. The first value may for example be named as "PCEF_CONFIGURATION (0)", and the second value may for example be named as "ONLY_AUTHORIZATION_CHECK (1)". To provide backward compatibility, the absence of this new AVP should preferably indicate that a configuration of the PCEF according to the requested service information is requested.

If a new AVP with the above-mentioned name is used, the message format of a Diameter AA-Request (AAR) may be as follows:

```
<AA-Request> ::= < Diameter Header: 265, REQ, PXY >
    < Session-Id >
    { Auth-Application-Id }
    { Origin-Host }
    { Origin-Realm }
    { Destination-Realm }
    *[ Media-Component-Description ]
    [ AF-Charging-Identifier ]
    [SIP-Forking-Indication ]
    *[ Specific-Action ]
    *[ Subscription-ID ]
    [ Reservation-Priority ]
    [ Framed-IP-Address ]
    [Framed-IPv6-Prefix ]
    [Service-URN ]
    [Authorization-Check-Request ]
    *[ Proxy-Info ]
    *[ Route-Record ]
    *[ AVP ]
```

As an alternative, the semantics of an existing AVP could be used for the above-described indication. For example, the "Codec-Data" AVP, which is part of the encoding of the requested service information sent from P-CSCF to PCRF, may be enhanced to use it as the indication whether or not a configuration of the PCEF is requested. Within one line, the codec data AVP contains an indication if it is derived from an SDP offer or answer. Within a media component AVP, zero one or two codec data AVPs may be contained. Typically, a codec data AVP derived from the SDP offer and a codec data AVP derived from the SDP answer will be contained in the media component AVP, if service information derived from an SDP answer is provisioned.

The semantics of the AVP may accordingly be enhanced as follows: If only codec data AVPs derived from SDP offers are contained in a service information, the P-CSCF requests that the PCEF checks the authorization of the requested service information without configuring the PCEF accordingly. Otherwise, the P-CSCF requests that the PCRF configures the PCEF according to the requested service information.

The above-mentioned designation of service information suitable for being authorized from the PCRF to the P-CSCF after an unsuccessful authorization at the PCRF may also be implemented by way of a new Diameter AVP. Such a new AVP, which may e.g. be of OctetString type, may for example be named as "Acceptable-SDP" AVP, which could for example have AVP code 524. It shall thus contain session description payload that is acceptable according to policies in the PCRF. The OctetString value shall for example contain SDP line(s) in ASCII encoding separated by newline characters.

If a new AVP with the above-mentioned name is used, the message format of a Diameter AA-Answer (AAA) may be as follows:

```
<AA-Answer> ::= < Diameter Header: 265, PXY >
    < Session-Id >
    { Auth-Application-Id }
    { Origin-Host }
    { Origin-Realm }
    [ Result-Code ]
    [ Experimental-Result ]
    *[ Access-Network-Charging-Identifier ]
    [ Access-Network-Charging-Address ]
    [ Acceptable-SDP ]
    [ Error-Message ]
    [ Error-Reporting-Host ]
```

-continued

```
<AA-Answer> ::= < Diameter Header: 265, PXY >
         *[ Failed-AVP ]
         *[ Proxy-Info ]
         *[ AVP ]
```

In the following, some exemplary embodiments of the present invention will be described with reference to FIGS. 4 to 7, which each show a flow diagram illustrating a signaling flow of methods according to embodiments of the present invention. In detail, FIGS. 4 to 7 are mainly related to specifications 3GPP TS 29.213 and TS 29.214.

In general, the below numberings in the form X-Y refer to the respectively numbered process Y in the figure X, respectively.

Figure 4:
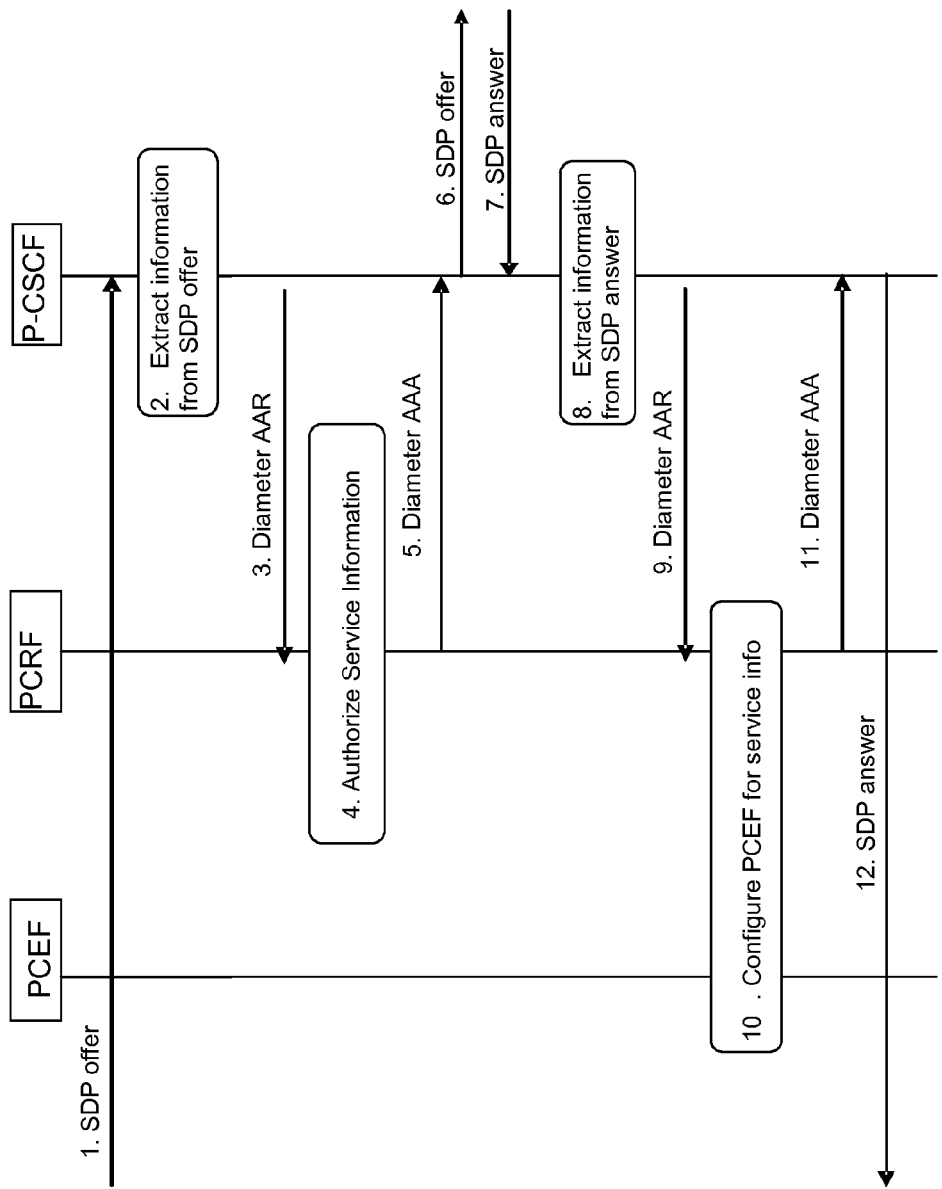

FIG. 4 shows a flow diagram illustrating a signaling flow of a method according to an embodiment of the present invention, i.e. a message flow between PCC network elements for an IMS session establishment procedure.

The sequence according to the case of FIG. 4 is as follows.

4-1. The P-CSCF receives an SDP offer in SIP signalling, e.g. in a SIP INVITE request, or a SIP UPDATE request, or a SIP PRACK request, or a SIP response message.

4-2. The P-CSCF extracts information from the SDP offer and translates that to service information.

4-3. The P-CSCF forwards the derived requested service information to the PCRF by sending a Diameter AAR. Within this message, the P-CSCF includes an AVP, as described above, to indicate that it requests the authorization of the service information only, but no configuration of the PCEF due to this service information.

4-4. The PCRF checks the requested service information e.g. to verify that it is allowed by the operator's policy and/or the subscription of the corresponding user. The PCRF decides to authorize the service information.

4-5. The PCRF replies to the P-CSCF with a Diameter AAA. If the PCRF had decided not to authorize the requested service information, it would have included an appropriate failure cause in this message to indicate this.

4-6. Upon successful authorization of the service information, the P-CSCF forwards the SDP offer in SIP signalling towards a destination entity, e.g. a callee's terminal equipment.

4-7. The P-CSCF receives a SIP message from the terminating side containing an SDP answer, which contains the negotiated SDP parameters for the service.

4-8. The P-CSCF extracts information from the SDP answer and translates that to service information.

4-9. The P-CSCF forwards the derived service information to the PCRF by sending a Diameter AAR over the existing Rx Diameter session. Within this message, the P-CSCF includes an AVP, as described above, to indicate that it requests the configuration of the PCEF according to this service information.

4-10. The PCRF authorizes the requested service information and configures the PCEF for this service by provisioning suitable PCC rules and authorized QoS for the service.

4-11. The PCRF replies to the P-CSCF with a Diameter AAA.

4-12. The P-CSCF forwards the SDP answer in SIP signalling.

That is, upon initial provisioning of session information or a modification of session information, the following applies.

The P-CSCF may include an Authorization-Check-Request AVP to indicate to the PCRF that only an authorization check of the requested Service Information within Media-Component-Description AVP(s) is requested. When the PCRF receives an initial AA-Request or an AA-Request containing updated service information from the P-CSCF, the PCRF may check if the service information provided in the AA-Request command is acceptable according to local policy (e.g. if the subscribed guaranteed bandwidth is exceeded and if the user subscribed to the requested service). If the PCRF decides not to authorize the requested service information, the PCRF shall indicate in the AA-Answer the cause for the rejection with the Experimental-Result-Code AVP set to the value REQUESTED_SERVICE_NOT_AUTHORIZED. The PCRF may additionally provide acceptable service information within an Acceptable-SDP AVP.

In view of IMS-related procedures over the Rx reference point, as regards provision of service information at P-CSCF, the following applies.

The P-CSCF shall send service information to the PCRF upon every SIP message that includes an SDP payload. The initial service information shall be derived from the SDP offer. The P-CSCF shall provision this service information derived from the SDP offer to the PCRF and indicate within the Authorization-Check-Request AVP that only an authorization check is requested. When an SDP answer is received, the service information shall be updated accordingly. The P-CSCF shall provision this service information derived from the SDP answer to the PCRF and indicate within the Authorization-Check-Request AVP that a PCEF configuration is requested. This ensures that the PCRF receives proper information to perform media authorization for all possible IMS session set-up scenarios, and that the PCRF is also capable of handling session modifications.

The PCRF may decide not to authorize requested service information and will indicate this to the P-CSCF by sending an AA-Answer with Experimental-Result-Code AVP set to the value REQUESTED_SERVICE_NOT_AUTHORIZED. The PCRF may additionally provide acceptable service information within an Acceptable-SDP AVP. The P-CSCF will apply this information to reject the SDP, which has been mapped to the service information.

Figure 5:
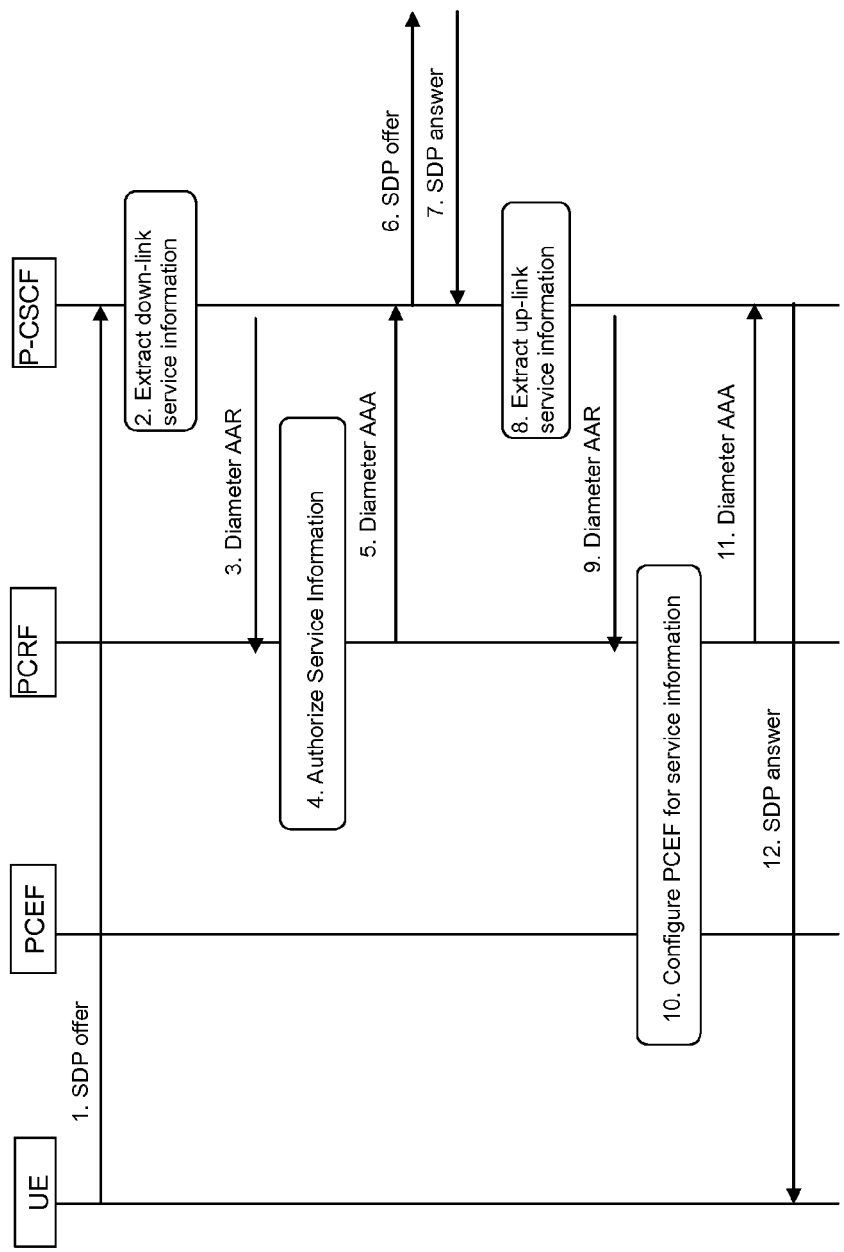

FIG. 5 shows a flow diagram illustrating a signaling flow of a method according to an embodiment of the present invention, i.e. a message flow between PCC network elements for an IMS session establishment procedure, wherein service information is provisioned at originating P-CSCF and PCRF.

The sequence according to the case of FIG. 5 is as follows.

5-1. The P-CSCF receives the first SDP offer for a new SIP dialogue within a SIP INVITE request from a user equipment UE.

5-2. The P-CSCF extracts service information from the SDP offer (IP address of the down link IP flow(s), port numbers to be used etc. . . . ).

5-3. The P-CSCF forwards the derived service information to the PCRF by sending a Diameter AAR over a new Rx Diameter session. It indicates that only an authorization check of the service information is requested.

5-4. The PCRF checks and authorizes the service information, but does not configure the PCEF at this stage.

5-5. The PCRF replies to the P-CSCF with a Diameter AAA.
5-6. The P-CSCF forwards the SDP offer in SIP signalling.
5-7. The P-CSCF receives the negotiated SDP parameters from the terminating side within a SDP answer in SIP signalling.
5-8. The P-CSCF extracts service information from the SDP answer (IP address of the up-link media IP flow(s), port numbers to be used etc. . . . ).
5-9. The P-CSCF forwards the derived service information to the PCRF by sending a Diameter AAR over the existing Rx Diameter session.
5-10. The PCRF authorizes the session information. The PCRF performs steps according to an AF session establishment triggering PCRF-Initiated IP-CAN Session Modification. These steps imply provisioning of PCC rules and authorized QoS to the PCEF.
5-11. The PCRF replies to the P-CSCF with a Diameter AAA.
5-12. Upon successful authorization of the session, the SDP parameters are passed to the UE in SIP signalling.

Figure 6:
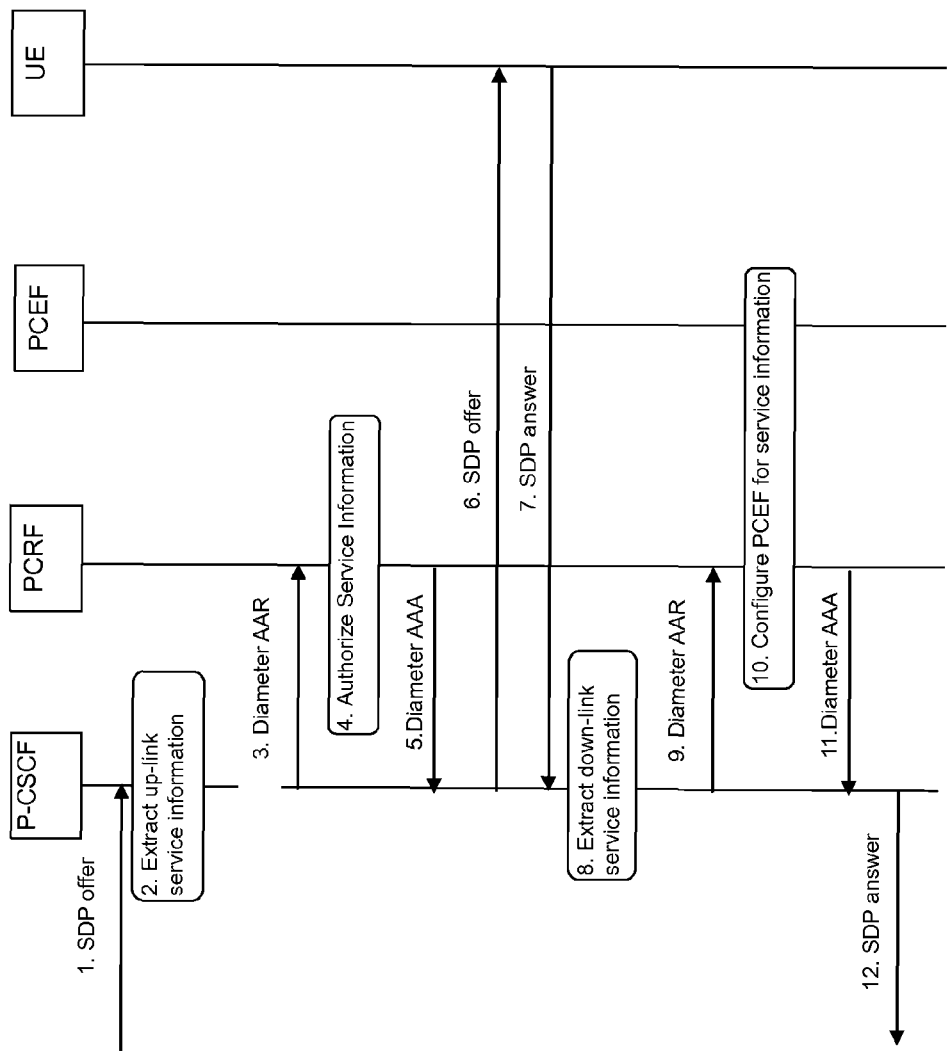

FIG. 6 shows a flow diagram illustrating a signaling flow of a method according to an embodiment of the present invention, i.e. a message flow between PCC network elements for an IMS session establishment procedure, wherein service information is provisioned at terminating P-CSCF and PCRF.

The sequence according to the case of FIG. 6 is as follows.

6-1. The P-CSCF receives the first SDP offer for a new SIP dialogue within SIP signalling, e.g. within a SIP INVITE request.
6-2. The P-CSCF extracts the service information from the SDP offer (IP address of the up-link IP flow(s), port numbers to be used etc. . . . ).
6-3. The P-CSCF forwards the derived session information to the PCRF by sending a Diameter AAR over a new Rx Diameter session. It indicates that only an authorization check of the service information is requested.
6-4. The PCRF checks and authorizes the session information, but does not configure the PCEF at this stage.
6-5. The PCRF replies to the P-CSCF with a Diameter AAA.
6-6. The P-CSCF sends the SDP offer to the user equipment UE.
6-7. The P-CSCF receives the negotiated SDP parameters from the user equipment UE within an SDP answer in SIP signalling.
6-8. The P-CSCF extracts service information from the SDP answer (IP address of the down-link IP flow(s), port numbers to be used etc. . . . ).
6-9. The P-CSCF forwards the derived service information to the PCRF by sending a Diameter AAR over the existing Rx Diameter session.
6-10. The PCRF authorizes the session information. The PCRF performs steps according to an AF session establishment triggering PCRF-Initiated IP-CAN Session Modification. These steps imply provisioning of PCC rules and authorized QoS to the PCEF.
6-11. The PCRF sends a Diameter AAA to the P-CSCF.
6-12. Upon successful authorization of the session the SDP parameters in the SDP answer are passed to the originator.

Figure 7:
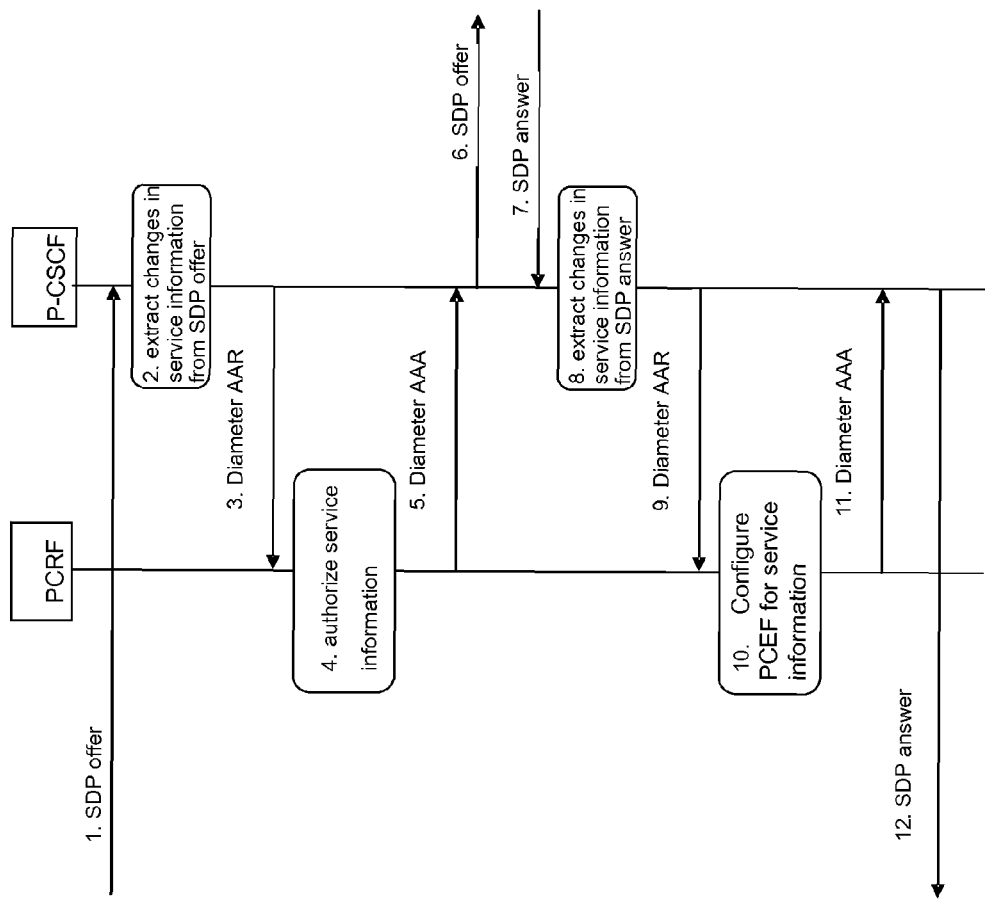

FIG. 7 shows a flow diagram illustrating a signaling flow of a method according to an embodiment of the present invention, i.e. a message flow between PCC network elements for an IMS session modification procedure, wherein service information is provisioned.

The sequence according to the case of FIG. 7 is as follows.

7-1. The P-CSCF receives an SDP offer in SIP signalling for an exiting SIP dialogue.
7-2. The P-CSCF identifies the relevant changes in the SDP and extracts the corresponding service information.
7-3. The P-CSCF forwards the derived service information to the PCRF by sending a Diameter AAR over the existing Rx Diameter session for the corresponding SIP session. It indicates that only an authorization check of the service information is requested.
7-4. The PCRF checks and authorizes the session information, but does not configure the PCEF at this stage.
7-5. The PCRF replies to the P-CSCF with a Diameter AAA.
7-6. The P-CSCF forwards the SDP offer in SIP signalling.
7-7. The P-CSCF receives the negotiated SDP parameters within an SDP answer in SIP signalling from the terminating side.
7-8. The P-CSCF identifies the relevant changes in the SDP and extracts the corresponding service information.
7-9. The P-CSCF sends a Diameter AAR for an existing Diameter session and includes the derived updated service information.
7-10. The PCRF performs steps according to an AF session modification triggering PCRF-Initiated IP-CAN Session Modification. These steps may imply provisioning of PCC rules and authorized QoS to the PCEF. The PCRF may need to enable or disable IP Flows due to the updated service information.
7-11. The PCRF answers with a Diameter AAA.
7-12. The P-CSCF forwards the SDP answer in SIP signalling.

Any functions, methods and operations described above in accordance with the various example embodiments of the present invention may of course be implemented by way of software and/or hardware.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Generally, for the purpose of the present invention as described herein above, it should be noted that a communication device or terminal may for example be any device by means of which a user may access a network and/or a server of such network; this implies mobile as well as non-mobile devices and networks, independent of the technology platform on which they are based; only as an example, it is noted that terminals operated according to principles standardized by the $3^{rd}$ Generation Partnership Project 3GPP and known for example as UMTS terminals (Universal Mobile Telecommunication System) are particularly suitable for being used in connection with the present invention, nevertheless terminals conforming to standards such as GSM (Global System for Mobile communications) or IS-95 (Interim Standard 95) may also be suitable;

networks referred to in this connection may comprise mobile and fixed network sections independent of the type of technology on which the networks are operated, for example those networks operate on the basis of the Internet Protocol IP, independent of the protocol version (IPv4 or IPv6), or on the basis of any other packet protocol such as User Datagram Protocol UDP, etc.

devices can be implemented as individual devices, devices may also be implemented as a module configured to accomplish interoperability with other modules constituting an entire apparatus, e.g. a module device may be represented as a chipset or chip card e.g. insertable and/or connectable to an apparatus such as a mobile phone, or a module may be realized by executable code stored to a mobile phone or other device for execution upon invocation.

Although described above mainly with respect to methods, procedures, an apparatus and modules thereof, it is to be understood that the present invention also covers a computer program products for implementing such methods or procedures and/or for operating such apparatuses or modules, as well as storage media for storing such computer program products. The present invention also covers any conceivable combination of method steps and operations described above, and any conceivable combination of nodes, apparatuses and modules described above, as long as the above-described concepts of methodology and structural arrangement are applicable.

In view of the foregoing, firstly, there are essentially presented modifications/corrections to IMS callflows for rejection of service change. Namely, updated IMS callflows are presented to show that SDP derived from an SDP offer is already provisioned by the P-CSCF.

In view of the foregoing, secondly, there is presented a procedural description about the rejection of service information. An SDP encoding of acceptable service information is proposed e.g. in the Acceptable-SDP AVP that can be mapped to a SIP 488 response with minimal effort at the P-CSCF. An AVP is exemplarily introduced, which allows the AF/P-CSCF to request only an authorization check of requested service information, but no PCEF configuration.

By way of the above-described features previously set requirements for service rejection in earlier specifications (of stage 2) may be satisfied in succeeding specifications (of stage 3).

In summary, for example there are disclosed measures for policy control in a network, including an authorization check. Namely, a method of policy control in a network comprises obtaining, at an application function entity of the network, a request for a service, determining, at the application function entity, whether service information associated with the requested service requires an authorization check or a configuration of a policy enforcement entity of the network, and providing, depending on the determining result, an indication from the application function entity to a policy control entity of the network, whether or not the policy enforcement entity is to be configured for the requested service information, together with that requested service information.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

What is claimed is:

1. A method of policy control suitable for use in a network, comprising:
    obtaining, at an application function entity of the network, a session description protocol (SDP) payload comprising a request for a service;
    determining, at the application function entity, whether service information associated with the requested service requires (a) only an authorization check or (b) both an authorization check and a configuration of a policy enforcement entity of the network, wherein the determining comprises the application function entity determining whether the session description protocol (SDP) payload is of offer type or of answer type; and
    providing, depending on the determining result, an indication from the application function entity to a policy control entity of the network, whether or not the policy enforcement entity is to be configured for the requested service information, together with that requested service information.

2. The method according to claim 1, wherein the indication provisioning comprises:
    providing an indication that the policy enforcement entity is to be configured for the requested service information, if the session description protocol (SDP) payload is of answer type.

3. The method according to claim 2, further comprising:
    initiating, at the policy control entity, a configuration of the policy enforcement entity for the requested service information.

4. The method according to claim 1, wherein the indication provisioning comprises:
    providing an indication that the policy enforcement entity is not to be configured, but an authorization of the requested service information is to be checked at the policy control entity, if the session description protocol (SDP) payload is of offer type.

5. The method according to claim 4, further comprising:
    checking, at the policy control entity, an authorization of the requested service information based on a local policy.

6. The method according to claim 5, further comprising:
    responding by giving a cause for non-authorization from the policy control entity to the application function entity, if the requested service information is not authorized.

7. The method according to claim 5, further comprising:
responding by designating service information suitable for being authorized from the policy control entity to the application function entity, if the requested service information is not authorized.

8. The method according to claim 5, further comprising:
responding by indicating a successful authorization from the policy control entity to the application function entity, if the requested service information is authorized.

9. The method according to claim 1, further comprising:
deciding, at the application function entity, depending on a response from the policy control entity, whether to reject the requested service, to forward requested service information from the application function entity towards a destination entity, or to reply to the received service request with service information.

10. The method according to claim 1, further comprising:
modifying requested service information, at the application function entity, wherein the indication provisioning is based on the modified requested service information.

11. The method according to claim 1, wherein an interface between the application function entity and the policy control entity is based on a Diameter protocol.

12. The method according to claim 11, wherein the providing the indication from the application function entity to the policy control entity is effected by an attribute value pair of a Diameter request message.

13. The method according to claim 12, wherein the attribute value pair is of enumerated type and/or of octet-string type.

14. The method according to claim 11, wherein giving a cause or designating suitable service information is effected by an attribute value pair of a Diameter answer message.

15. The method according to claim 1, wherein the network comprises an Internet Protocol Multimedia Subsystem.

16. The method according to claim 1, wherein policy control in the network is based on at least one of a policy and charging control framework, a service based local policy framework, and a flow based charging framework.

17. A computer program embodied on a non-transitory computer readable medium, the computer program comprising program code means being configured, when run on a processor of an apparatus, to perform the method of claim 1.

18. An apparatus operable to act as an application function entity suitable for use in a network, comprising:
obtaining means for obtaining a session description protocol (SDP) payload comprising a request for a service;
determining means for determining whether service information associated with the requested service requires (a) only an authorization check or (b) both an authorization check and a configuration of a policy enforcement entity of the network, wherein the determining means comprises means for determining whether the session description protocol (SDP) payload is of offer type or of answer type; and
providing means for providing, depending on the determining result, an indication to a policy control entity of the network, whether or not the policy enforcement entity is to be configured for the requested service information, together with that requested service information.

19. The apparatus according to claim 18, wherein the providing means is arranged for providing an indication that the policy enforcement entity is to be configured for the requested service information, if the session description protocol (SDP) payload is of answer type.

20. The apparatus according to claim 18, wherein the providing means is arranged for providing an indication that the policy enforcement entity is not to be configured, but an authorization of the requested service information is to be checked at the policy control entity, if the session description protocol (SDP) payload is of offer type.

21. The apparatus according to claim 18, further comprising:
deciding means for deciding, depending on a response from the policy control entity, whether to reject the requested service, to forward requested service information from the application function entity towards a destination entity, or to reply to the received service request with service information.

22. The apparatus according to claim 18, wherein the apparatus is arranged for communicating with the policy control entity based on a Diameter protocol.

23. The apparatus according to claim 18, wherein the apparatus is operable as a proxy call session control function.

24. A system of policy control suitable for use in a network, said system comprising:
at least one apparatus operable to act as an application function entity according to claim 18, and at least one apparatus operable to act as a policy control entity, including receiving means for receiving an indication from an application function entity of the network whether or not service information associated with a requested service requires (a) an authorization check or (b) an authorization check and a configuration of a policy enforcement entity of the network.

25. An apparatus operable to act as a policy control entity suitable for use in a network, said apparatus comprising:
receiving means for receiving an indication from an application function entity of the network whether or not service information associated with a requested service requires (a) only an authorization check or (b) both an authorization check and a configuration of a policy enforcement entity of the network;
initiating means for initiating a configuration of the policy enforcement entity for the requested service information, if an indication is received from the application function entity that the policy enforcement entity is to be configured for the requested service information; and
checking means for checking an authorization of the requested service information based on a local policy, if an indication is received from the application function entity that the policy enforcement entity is not to be configured, but an authorization of the requested service information is to be checked at the policy control entity.

26. The apparatus according to claim 25, further comprising:
responding means for giving a cause for non-authorization to the application function entity, if the checking means yields that the requested service information is not authorized.

27. The apparatus according to claim 25, further comprising:
responding means for designating service information suitable for being authorized to the application function entity, if the checking means yields that the requested service information is not authorized.

28. The apparatus according to claim 25, further comprising:
    responding means for indicating a successful authorization to the application function entity, if the checking means yields that the requested service information is authorized.

29. The apparatus according to claim 25, wherein the apparatus is configured to communicate with the application function entity based on a Diameter protocol.

30. The apparatus according to claim 25, wherein the apparatus is operable as a policy and charging rules function.

31. The apparatus according to claim 25, wherein the apparatus is operable as a policy decision function.

32. The apparatus according to claim 25, wherein the apparatus is operable as a charging rules function.

\* \* \* \* \*